(12) United States Patent
Yokota

(10) Patent No.: US 8,520,150 B2
(45) Date of Patent: *Aug. 27, 2013

(54) LIGHTING DEVICE, DISPLAY DEVICE AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/378,710

(22) PCT Filed: May 17, 2010

(86) PCT No.: PCT/JP2010/058272
§ 371 (c)(1),
(2), (4) Date: Dec. 16, 2011

(87) PCT Pub. No.: WO2011/001749
PCT Pub. Date: Jan. 6, 2011

(65) Prior Publication Data
US 2012/0086875 A1 Apr. 12, 2012

(30) Foreign Application Priority Data
Jun. 30, 2009 (JP) ................................. 2009-155516

(51) Int. Cl.
*H04N 5/66* (2006.01)
*G02F 1/1335* (2006.01)

(52) U.S. Cl.
USPC ............................................ 348/790; 349/62

(58) Field of Classification Search
USPC .................... 348/790, 791, 794; 362/249.02, 362/235; 349/62, 56, 58
See application file for complete search history.

(56) References Cited

U.S. PATENT DOCUMENTS 6,663,262 B2 * 12/2003 Boyd et al. ..................... 362/600
6,862,054 B2 * 3/2005 Kawakami ...................... 349/65

(Continued)

FOREIGN PATENT DOCUMENTS

EP 2 023 038 A2 2/2009
JP 2005-117023 A 4/2005

(Continued)

OTHER PUBLICATIONS

Official Communication issued in International Patent Application No. PCT/JP2010/058272, mailed on Aug. 10, 2010.

(Continued)

*Primary Examiner* — Paulos M Natnael
(74) *Attorney, Agent, or Firm* — Keating & Bennett, LLP

(57) ABSTRACT

It is an object of the present invention to provide a lighting device realizing reduction in cost and suppression of power consumption and suppressing generation of a lamp image. A lighting device 12 of the present invention includes a plurality of point light sources 80; a chassis 14 housing the point light sources 80 and having an opening 14b through which light from the point light sources 80 exits; and an optical member 15 (15a) facing the point light sources 80 and provided to cover the opening 14b. The point light sources 80 are arranged such that a light source high-density area LH where an arrangement interval thereof is relatively small and a light source low-density area LL where an arrangement interval thereof is relatively large are provided. Light reflection portions 50 reflecting lights from the point light sources 80 are formed in at least a region overlapping with the light source low-density area LL in the optical member 15 (15a).

16 Claims, 12 Drawing Sheets

(56) References Cited

U.S. PATENT DOCUMENTS

| | | | |
|---|---|---|---|
| 7,152,988 B2* | 12/2006 | Hung | 362/97.2 |
| 7,474,475 B2* | 1/2009 | Paek et al. | 359/726 |
| 7,594,743 B2* | 9/2009 | Kimura et al. | 362/610 |
| 7,641,373 B2* | 1/2010 | Sugawara et al. | 362/560 |
| 8,382,306 B2* | 2/2013 | Cho | 362/97.2 |
| 2006/0092662 A1 | 5/2006 | Noh et al. | |
| 2006/0215386 A1 | 9/2006 | Hatanaka et al. | |
| 2006/0290620 A1 | 12/2006 | Chou et al. | |
| 2007/0024990 A1* | 2/2007 | Paek et al. | 359/725 |
| 2007/0086181 A1 | 4/2007 | Hatanaka et al. | |
| 2007/0147217 A1* | 6/2007 | Haruguchi et al. | 369/112.01 |
| 2008/0303757 A1* | 12/2008 | Ohkawa et al. | 345/82 |
| 2009/0116245 A1* | 5/2009 | Yamaguchi | 362/311.01 |
| 2009/0129058 A1* | 5/2009 | Tokita et al. | 362/97.2 |
| 2009/0284951 A1 | 11/2009 | Muschaweck | |
| 2012/0057097 A1* | 3/2012 | Shimizu | 349/61 |
| 2012/0127395 A1* | 5/2012 | Yokota | 349/61 |
| 2012/0169941 A1* | 7/2012 | Yokota | 348/739 |
| 2012/0218739 A1 | 8/2012 | Muschaweck | |
| 2012/0236213 A1* | 9/2012 | Shimizu | 348/790 |

FOREIGN PATENT DOCUMENTS

| | | |
|---|---|---|
| JP | 2008-286955 A | 11/2008 |
| JP | 2008-304502 A | 12/2008 |
| JP | 2009-117207 A | 5/2009 |
| WO | 2008/000244 A2 | 1/2008 |

OTHER PUBLICATIONS

Yokota, "Lighting Device, Display Device and Television Receiver", U.S. Appl. No. 13/378,708, filed Dec. 16, 2011.

Yokota, "Lighting Device, Display Device and Television Receiver", U.S. Appl. No. 13/378,712, filed Dec. 16, 2011.

* cited by examiner

FIG.1
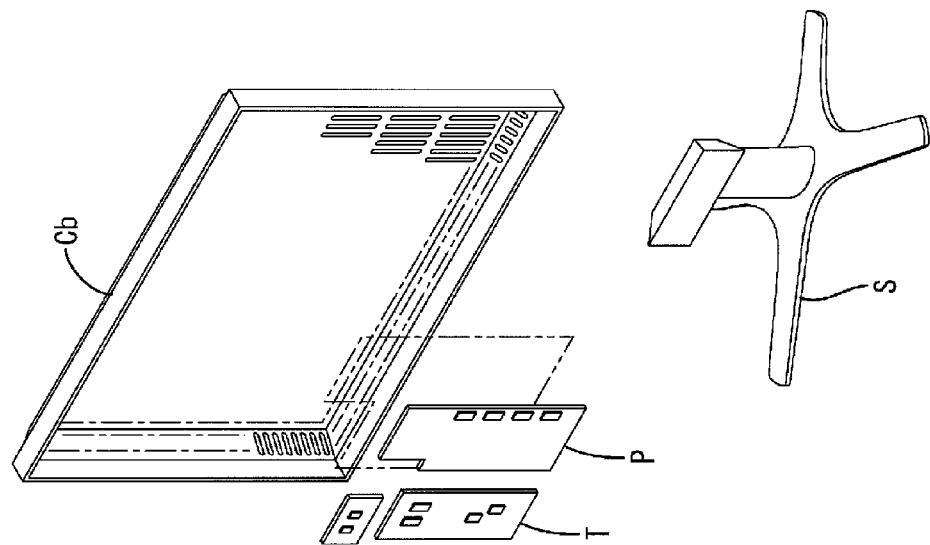
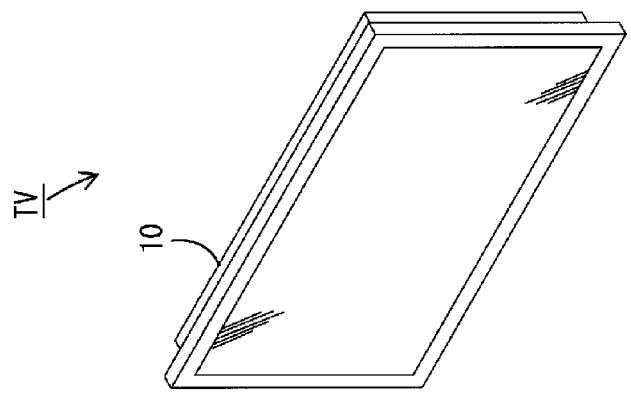
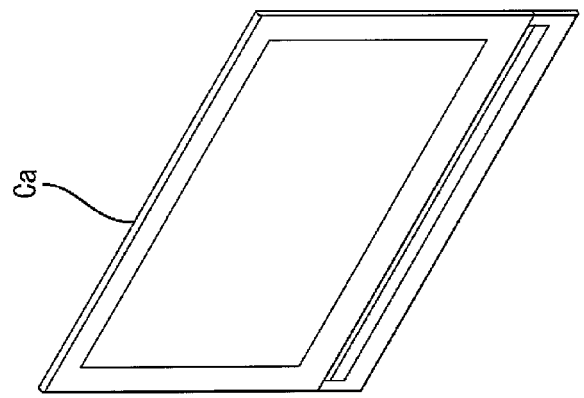

LIGHTING DEVICE, DISPLAY DEVICE AND TELEVISION RECEIVER

TECHNICAL FIELD

The present invention relates to a lighting device, a display device and a television receiver.

BACKGROUND ART

For example, a liquid crystal panel used for a liquid crystal display device such as a liquid crystal television does not emit light, and thus a backlight unit is required as a separate lighting device. The backlight unit is known, which is placed behind the liquid crystal panel (on a side opposite to a display surface side). The backlight unit includes a chassis having an opening on a liquid crystal panel side surface, numerous light sources (for example, LEDs) housed in the chassis as lamps, and an optical member (diffuser and the like) provided in the opening of the chassis and efficiently discharging light emitted from the light sources to the liquid crystal panel side.

When the light sources emit point-like light in the backlight unit, the point-like light is converted into planar light by the optical member to uniform in-plane brightness of illumination light. However, when the point-like light is not sufficiently converted into the planar light, a point lamp image is generated along arrangement of the light sources, which deteriorates display quality of the liquid crystal display device.

In order to suppress generation of the lamp image in the backlight unit, for example, it is desirable that the number of the light sources to be arranged is increased to reduce a distance between the light sources that are adjacent to each other or a diffusivity of the diffuser is increased. However, when the number of the light sources is increased, cost of the backlight unit is increased, and power consumption is also increased. When the diffusivity of the diffuser is increased, brightness cannot be increased, which disadvantageously requires an increase in the number of the light sources at the same time. Then, a known backlight unit suppressing power consumption and generation of a lamp image is disclosed in the following Patent Document 1.

The backlight unit described in Patent Document 1 includes a diffuser provided in a floodlight direction of a plurality of light sources. A pattern of dots for modulated light is printed on the diffuser. Particularly, a diameter of a dot located immediately above each light source is great. The diameter of the dot is reduced as departing from each light source. According to such a configuration, light emitted from the light sources is efficiently utilized, and thereby light having uniform brightness can be irradiated without increasing power consumption of each light source.

Patent Document 1: Japanese Unexamined Patent Publication No. 2005-117023

Problem to be Solved by the Invention

Because the dot pattern for modulated light is formed over the entire diffuser in the device disclosed in Patent Document 1, the light from the light sources is mostly reflected by the dots, and brightness tends to be reduced as the entire backlight unit. Because the diameter of the dot located immediately above the light source is great when the light source is particularly put on the center area of the backlight unit, brightness in a center area of an irradiation surface may be reduced. When the backlight unit is used for the display device, human eyes usually pay attention to a center area of a display screen. Therefore, when brightness in the center area is low, a low-brightness region tends to be conspicuous, which may remarkably reduce visibility. Thus, there is still room for improvement in development of a backlight unit suppressing power consumption and generation of a lamp image.

DISCLOSURE OF THE PRESENT INVENTION

The present invention was accomplished in view of the above circumstances. It is an object of the present invention to provide a lighting device realizing cost reduction, suppressing of power consumption, and suppressing lamp image generation. It is another object of the present invention to provide a display device including the lighting device. It is still another object of the present invention to provide a television receiver including the display device.

Means for Solving the Problem

To solve the above problem, a lighting device of the present invention includes a plurality of point light sources, a chassis housing the point light sources and having an opening through which light emitted from the point light sources exits, and an optical member facing the point light sources and provided to cover the opening. The point light sources are arranged at relatively small intervals in a light source high-density area and the point light sources are arranged at relatively large intervals in a light source low-density area. The optical member includes a light reflection portion so as to overlap at least the light source low-density area thereof. The light reflection portion is configured to reflect light emitted from the point light sources.

Thus, the point light sources are arranged such that the light source high-density area and the light source low-density area are provided. Thereby, the number of the point light sources can be reduced as compared with a case where the light source high-density area is formed over the entire chassis, to realize cost reduction and power saving. Because a distance between the point light sources that are adjacent to each other in the light source low-density area is comparatively larger when the light source low-density area is formed, light emitted from the point light sources is likely to reach the optical member without mixing the light with each other. As a result, brightness in a region overlapping with the point light sources in the optical member is locally increased, which tends to generate a lamp image. Then, in the present invention, the optical member has the light reflection portion reflecting light from each point light source formed in at least the region overlapping with the light source low-density area. Thereby, the light emitted from the point light sources in the light source low-density area is mostly reflected to the chassis side by the light reflection portion once. The light is reflected in the chassis while the light is mixed with each other, and can reach the optical member again. Thereby, almost uniform brightness can be obtained over the entire optical member, and the generation of the lamp image can be suppressed.

BRIEF DESCRIPTION OF THE DRAWINGS

FIG. 1 is an exploded perspective view illustrating a schematic configuration of a television receiver according to a first embodiment of the present invention;

BEST MODE FOR CARRYING OUT THE INVENTION

<First Embodiment>

A first embodiment of the present invention will be described with reference to FIGS. 1 to 6.

First, a configuration of a television receiver TV including a liquid crystal display device 10 will be described.

Figure 2:
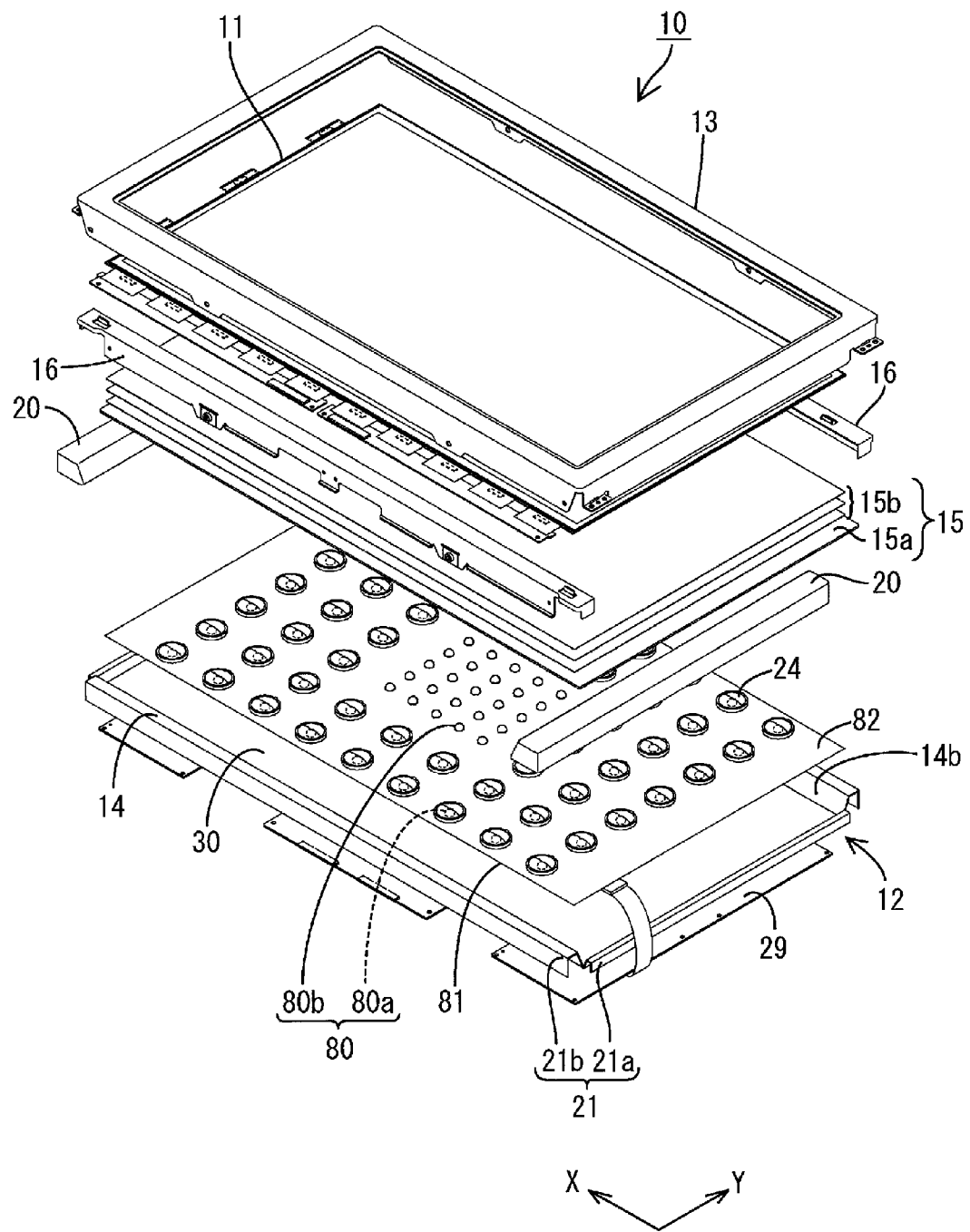
FIG. 2 is an exploded perspective view illustrating a schematic configuration of a liquid crystal display device included in the television receiver.

As illustrated in FIG. 1, the television receiver TV of the present embodiment includes the liquid crystal display device 10, front and rear cabinets Ca, Cb which house the liquid crystal display device 10 therebetween, a power source P, a tuner T and a stand S. An entire shape of the liquid crystal display device (display device) is a landscape rectangular. The liquid crystal display device 10 is housed in a vertical position. As illustrated in FIG. 2, the liquid crystal display device 10 includes a liquid crystal panel 11 as a display panel, and a backlight unit (lighting device) 12 as an external light source. The liquid crystal panel 11 and the backlight unit 12 are integrally held by a frame shaped bezel 13 and the like.

Next, the liquid crystal panel 11 and the backlight unit 12 included in the liquid crystal display device 10 will be described (see FIGS. 2 and 3).

The liquid crystal panel (display panel) 11 is configured such that a pair of glass substrates is bonded together with a predetermined gap therebetween and liquid crystal is sealed between the glass substrates. On one of the glass substrates, switching components (for example, TFTs) connected to source lines and gate lines which are perpendicular to each other, pixel electrodes connected to the switching components, and an alignment film and the like are provided. On the other substrate, color filters having color sections such as R (red), G (green) and B (blue) color sections arranged in a predetermined pattern, counter electrodes, and an alignment film and the like are provided. Polarizing plates 11a, 11b are attached to outer surfaces of the substrates (See FIG. 3).

As illustrated in FIG. 2, the backlight unit 12 includes a chassis 14, an optical sheet set 15 (a diffuser (optical member, optical diffusion member) 15a, and a plurality of optical sheets 15b which is provided between the diffuser 15a and the liquid crystal panel 11), and a frame 16. The chassis 14 has a substantially box-shape, and has an opening 14b on the light exit surface side (on the liquid crystal panel 11 side). The optical sheet set 15 is provided so as to cover the opening 14b of the chassis 14. The frame 16 provided along a long side of the chassis 14 holds a long-side edge portion of the diffuser 15a in a state where the long-side edge portion is sandwiched between the frame 16 and the chassis 14. The backlight unit 12 further includes an LED board 81 including point LED light sources (point light sources) 80, and outer edge members 20 formed in a short-side edge portion and directing light from the LED light sources 80 to the inside in the chassis 14. A light exit side of the backlight unit 12 is a side closer to the diffuser 15a than the LED boards 81.

The chassis 14 is made of metal. The chassis 14 is formed in a substantially shallow box shape through sheet metal forming. As illustrated in FIG. 3, the chassis 14 includes a rectangular bottom plate 30 and folded outer edge portions 21 (folded outer edge portions 21a in a short-side direction and folded outer edge portions 21b in a long-side direction), each of which extends upright from the corresponding peripheral edge of the bottom plate 30 and has a substantially U shape. Furthermore, as illustrated in FIG. 3, the chassis 14 includes fixing holes 14c formed in an upper surface of the folded outer edge portion 21b thereof to bind the bezel 13, the frames 16 and the chassis 14 and the like together with screws and the like.

The LED board 81 is laid on an inner surface of the bottom plate 30 of the chassis 14. The LED board 81 has a reflection sheet 82 laid on a light exit side surface, that is, a surface facing the diffuser 15a, and a plurality of LED light sources 80 surrounded by the reflection sheet 82, that is, provided so as to exposed from openings 82a (see FIG. 6) formed in the reflection sheet 82. Although one LED board 81 is used for the liquid crystal panel 11 in the present embodiment, for example, the LED board 81 may be divided into multiple, to properly arrange the plurality of LED boards 81 in a plane.

The LED light sources 80 emit white color light. For example, three kinds of red, green, and blue LED chips (not shown) may be face-mounted. Alternatively, the LED light sources 80 may be obtained by combining a blue LED chip with a yellow fluorescent material. As illustrated in FIGS. 3 and 4, the LED light sources 80 are arranged on the LED board 81 such that a light source high-density area LH where an arrangement interval thereof is relatively small is formed in a center area (that is, a center area of the chassis 14) of the LED board 81 and a light source low-density area LL where an arrangement interval thereof is relatively large is formed in an outer edge portion (that is, an outer edge portion of the chassis 14) of the LED board 81. An area of the light source high-density area LH located in the center area of the LED board 81 is smaller than an area of the light source low-density area LL located in the outer edge portion (outer side) of the LED board 81. In the present embodiment, the LED light sources provided in the light source high-density area LH are illustrated as high density side LED light sources 80b, and the LED light sources provided in the light source low-density area LL are illustrated as low density side LED light sources 80a.

The low density side LED light sources 80a of the LED light sources 80 are covered with diffuser lenses 24 for diffusing light emitted from the low density side LED light sources 80a. The high density side LED light sources 80b are not covered with the diffuser lenses 24.

Figure 6:
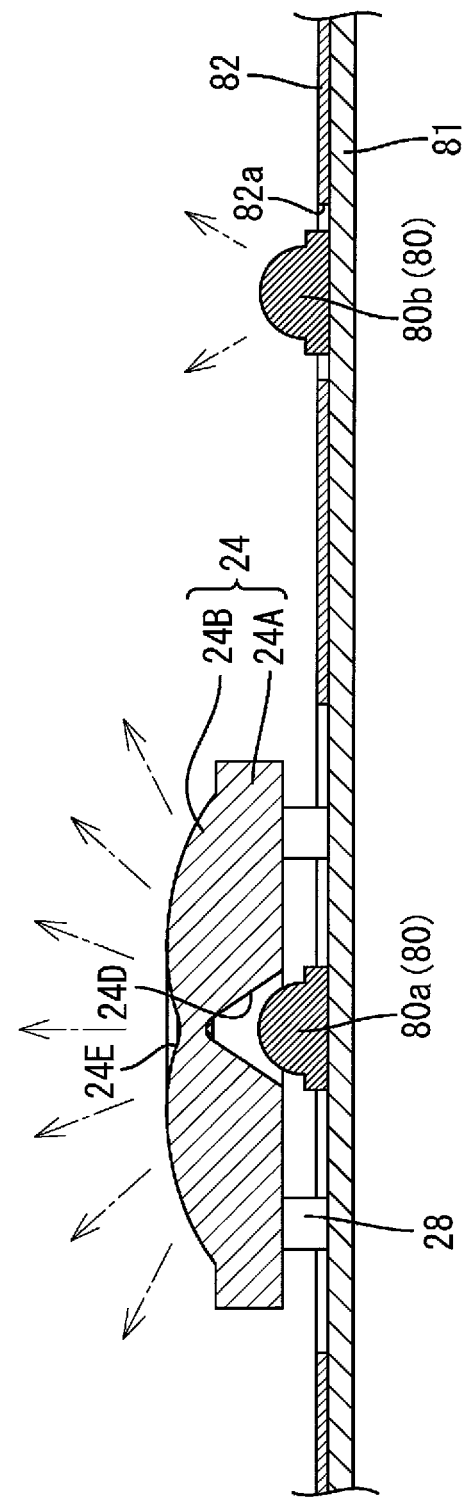
FIG. 6 is a sectional view illustrating a schematic configuration of an LED light source provided on the LED board.

The diffusion lens 24 is formed of a transparent member (for example, acrylic and polycarbonate) having a refractive index higher than that of air. The diffusion lens 24 functions to refract light emitted from each LED light source 80*a* to diffuse the light. The diffusion lens 24 has a circular shape in a plan view, and the LED light source 80*a* is provided at a center thereof. As illustrated in FIG. 6, the diffusion lens 24 is provided so as to cover the front side of the LED light source 80*a*. The diffusion lens 24 includes a base portion 24A having a circular plate shape in a plan view and a flat spherical portion 24B having a flat semi-spherical shape. Three leg parts 28 are provided so as to protrude from a peripheral portion of the diffuser lens 24. The three leg parts 28 are arranged at approximately equal intervals (intervals of about 120 degrees) from a center area of the diffuser lens 24 in a plan view. For example, the leg parts 28 are fixed to the LED board 81 by an adhesive or a thermosetting resin.

The diffuser lens 24 has a recess (light entrance side recess) 24D having a substantially conical shape formed in a lower surface (LED light source 80*a* side) thereof by denting a place located immediately above the LED light source 80*a* to the front side (upper side of FIG. 6, that is, the diffuser 15*a* side). The recess 24D has a side wall inclined so as to face the LED light source 80*a*. The lower surface (LED light source 80*a* side) of the diffuser lens 24 is subjected to surface roughness processing, to further improve diffusivity. The diffuser lens 24 also has a recess (light exit side recess) 24E having a substantially mortar shape formed in a top portion (a top portion located on a side (that is, light exit side) facing the diffuser 15*a*) thereof. The recess 24E includes an inner peripheral surface having a circular arc shape in a section view. As illustrated in FIG. 6, the light from the LED light source 80*a* is refracted over a wide angle on a boundary between the diffusion lens 24 and air by such a configuration, and is diffused to circumference of the LED light source 80*a*.

The reflection sheet 82 formed on the LED board 81 is made of a synthetic resin, and has a surface having white color that provides excellent light reflectivity. The reflection sheet 82 is provided along an inner surface of the bottom plate 30 of the chassis 14 to cover the almost entire chassis 14. The light emitted from the LED light sources 80 can be reflected to the diffuser 15*a* side by the reflection sheet 82.

Figure 3:
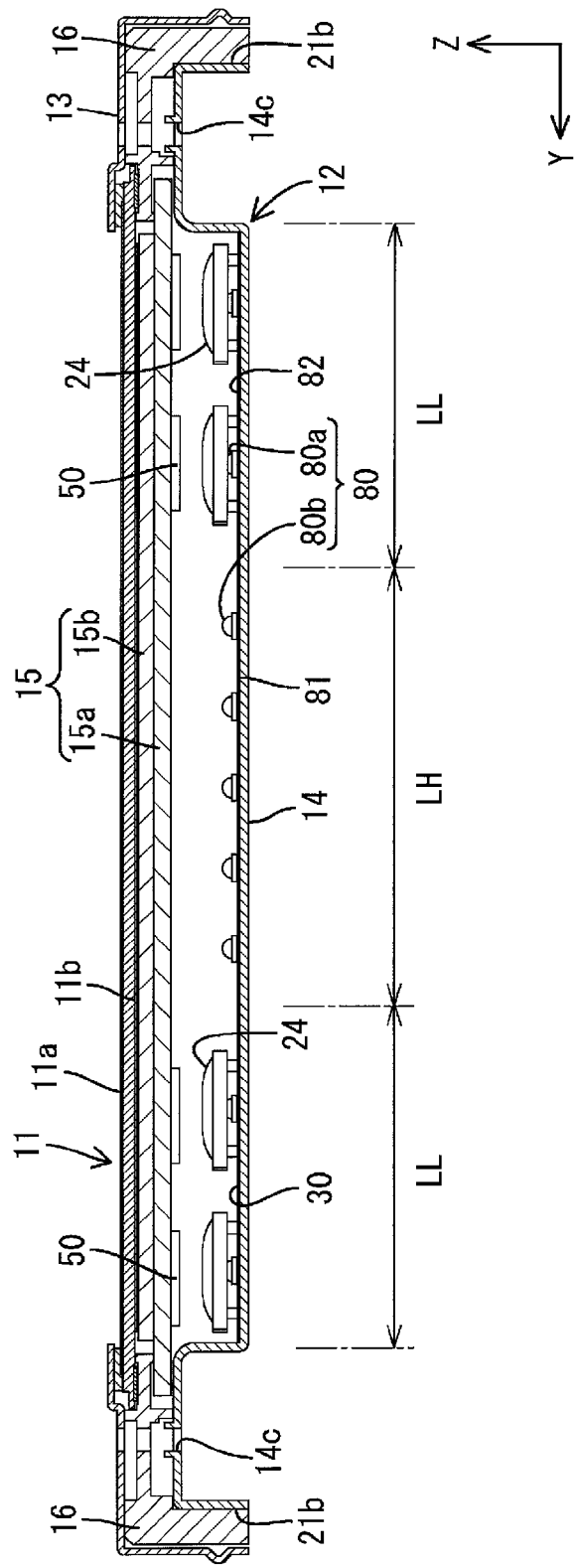
FIG. 3 is a cross-sectional view illustrating a cross-sectional configuration along a short-side direction of the liquid crystal display device.
Figure 4:
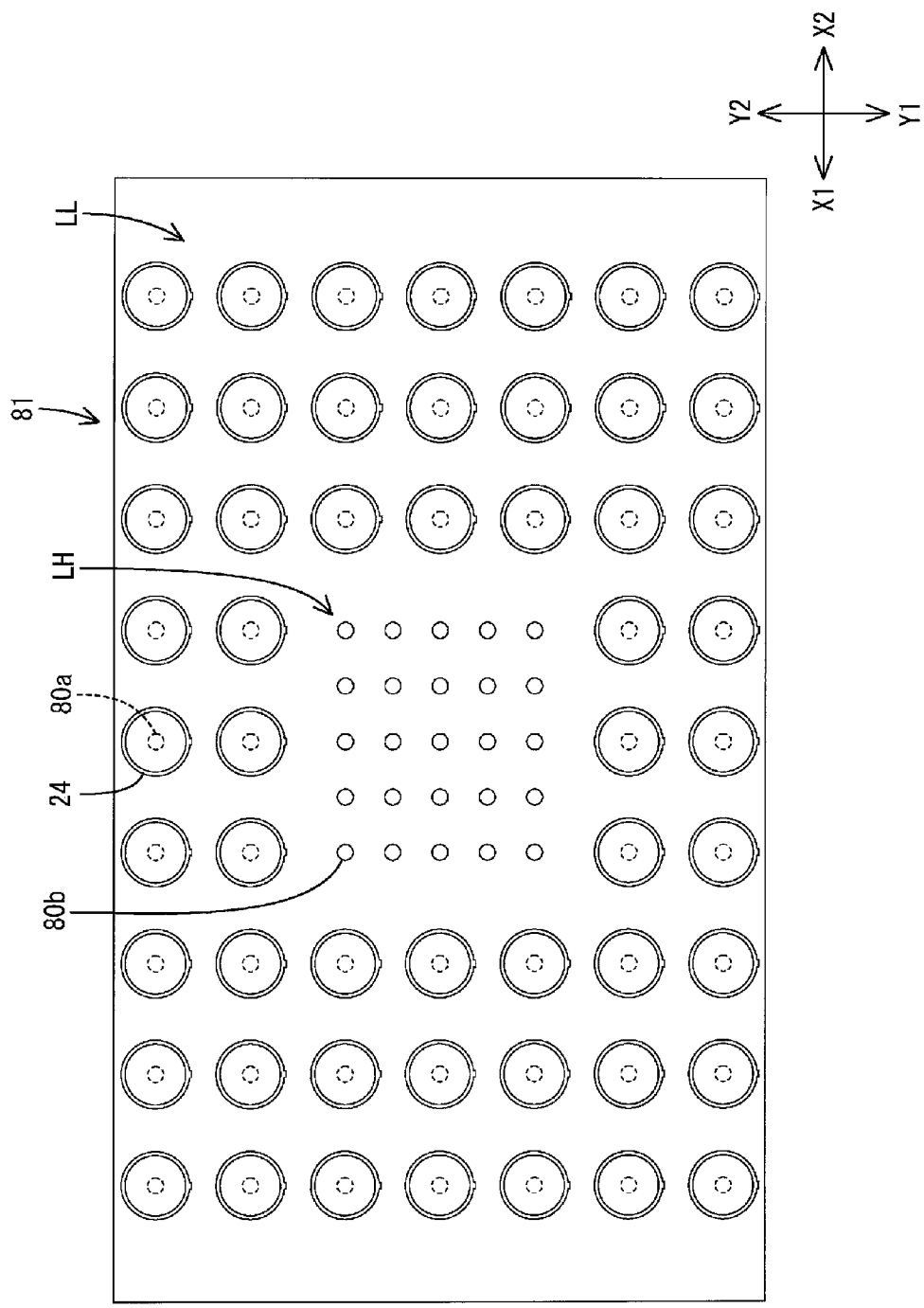
FIG. 4 is a plan view illustrating a schematic configuration of an LED board included in the liquid crystal display device.

As illustrated in FIG. 3, the chassis 14 includes a light source driving board 29 attached to an outer surface (a surface opposite to a surface on which the LED light sources 80 are provided) of the bottom plate 30 thereof to supply driving power to the LED light sources 80.

The optical sheet set 15 including the diffuser (optical member, optical diffusion member) 15*a* and the optical sheets 15*b* is provided on the opening side 14*b* of the chassis 14. The diffuser 15*a* includes a plate-like member made of a synthetic resin and light scattering particles dispersed in the plate-like member. The diffuser 15*a* has a function for diffusing point light emitted from the LED light sources 80 as the point light sources and also has a function for reflecting the light emitted from the LED light sources 80.

The diffuser 15*a* has an optical sheet 15*b* thereon. The optical sheet 15*b* is obtained by laminating a diffusion sheet, a lens sheet, and a reflection type polarizing plate in this order from the diffuser 15*a* side. The optical sheet 15*b* has a function for converting light emitted from the LED light source 80 and passed through the diffuser 15*a* into planar light. The optical sheet 15*b* has the liquid crystal panel 11 placed on the upper surface side thereof. The optical sheet 15*b* is sandwiched between the diffuser 15*a* and the liquid crystal panel 11.

Figure 5:
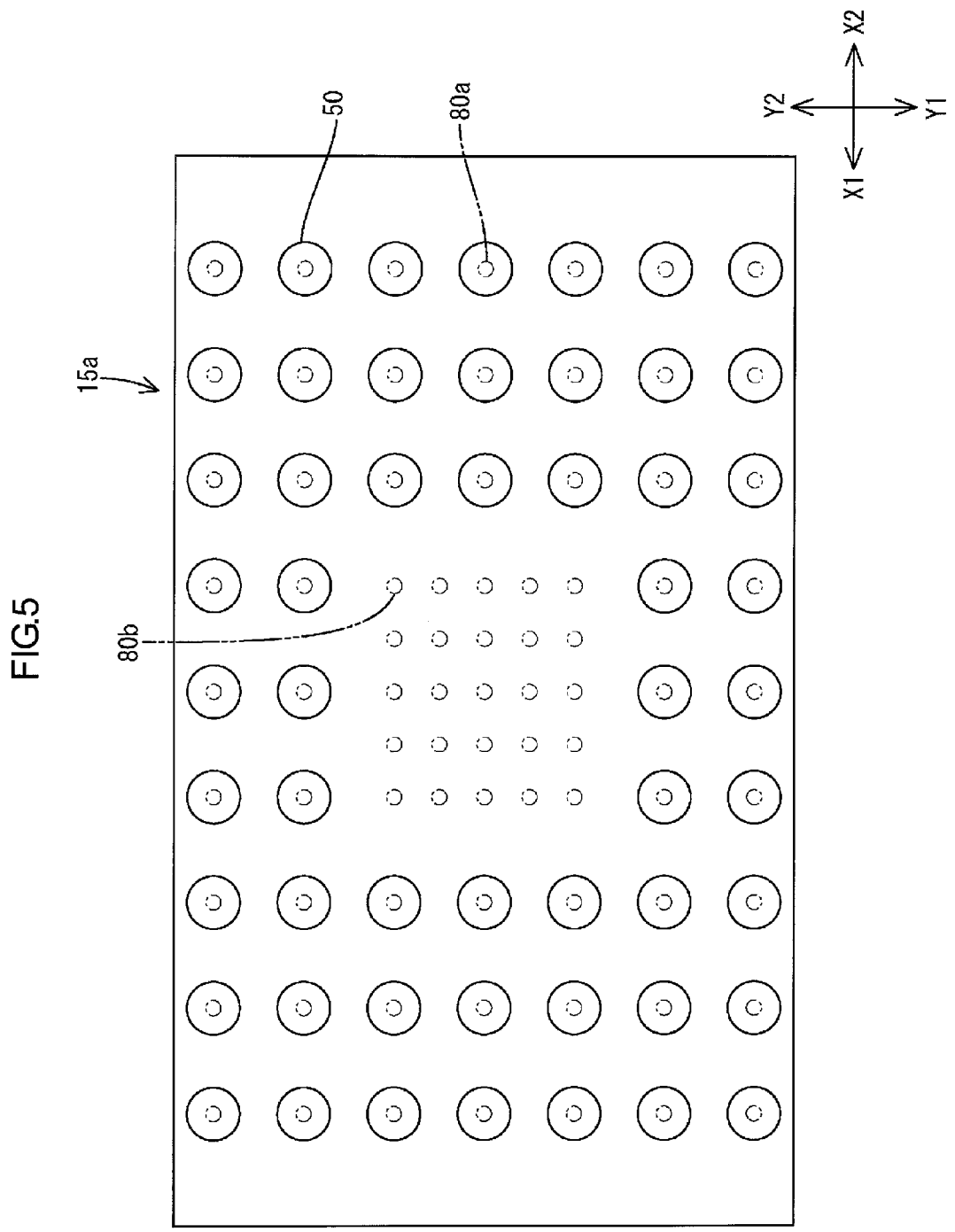
FIG. 5 is a schematic view illustrating an arranging mode of light reflection portions formed on a surface facing the LED board in a diffuser included in a backlight unit.

The light reflection function of the diffuser 15*a* and a forming aspect of the light reflection portion will be described with reference to FIGS. 3 to 5. In FIGS. 3 to 5, a long-side direction of the diffuser is defined as an X-axis direction; a short-side direction thereof is defined as a Y-axis direction; and a thickness direction thereof is defined as a Z-axis direction.

The diffuser 15*a* has light reflection portions 50 provided on a surface facing the LED light sources 80 and forming a white dot pattern. In the present embodiment, each dot of the light reflection portions 50 has a round shape. The dot pattern of the light reflection portions 50 are formed by printing paste containing metal oxide (titanium oxide and the like), for example, on the surface of the diffuser 15*a*. Preferable printing means are screen printing and inkjet printing and the like.

The light reflection portion 50 has a light reflectance of 80% in a surface facing the LED light source 80. The light reflection portion 50 has a light reflectance relatively greater than a light reflectance of 30% in a surface of the diffuser 15*a* itself. In this context, in the present embodiment, the light reflectance of each material is represented by an average light reflectance inside the measurement diameter measured with an LAV of CM-3700d (measurement diameter φ of 25.4 mm) manufactured by Konica Minolta. The light reflectance of the light reflection portion 50 is a value obtained by forming the light reflection portion 50 over an entire surface of a glass substrate and measuring the surface based on the above measuring means. The light reflectance of the light reflection portion 50 is preferably 80% or greater, and more preferably 90% or greater. Thus, as the light reflectance of the light reflection portion 50 is higher, the reflection degree can be controlled precisely and accurately according to an aspect of the dot pattern (the number of dots and the area of each dot and the like).

In the present embodiment, the light reflection portion 50 is provided in at least a region overlapping with the light source low-density area LL in the diffuser 15*a*. Particularly, the light reflection portion 50 is formed in a position overlapping with the low density side LED light source 80*a* in a plan view. As illustrated in FIG. 5, the light reflection portion 50 has a planarly viewed area greater than a planarly area of the LED light source 80 (low density side LED light source 80*a*). According to the arranging mode of the light reflection portions 50, the light reflectance of the diffuser 15*a* is the greatest in a region overlapping with the light source low-density area LL in a surface facing the LED light source 80 in the diffuser 15*a*.

The configuration of the liquid crystal display device 10 included in the television receiver TV of the first embodiment has been described above. Operations and effects exhibited by the configuration will then be described.

First, in the present embodiment, the backlight unit 12 has the plurality of point LED light sources 80 (80*a*, 80*b*). The LED light sources 80 (80*a*, 80*b*) are arranged such that the light source high-density area LH where the arrangement interval thereof is relatively small and the light source low-density area LL where the arrangement interval is relatively large are provided. The diffuser 15*a* includes the light reflection portion 50 reflecting light from each LED light source 80 (80*a*) formed in at least the region overlapping with the light source low-density area LL. Thus, the LED light sources 80 are arranged in the light source high-density area LH and the light source low-density area LL. Thereby, the number of the LED light sources 80 can be reduced as compared with a case where the light source high-density area LH is formed over the entire chassis 14, to enable realization of cost reduction and power saving.

Because the distance between the LED light sources 80, 80 (80*a*, 80*a*) that are adjacent to each other in the light source low-density area LL is comparatively large when the light source low-density area LL is formed, light emitted from the LED light sources 80 (80a) is likely to reach the diffuser 15a without mixing the light with each other. As a result, brightness in the region overlapping with the LED light sources 80 (80a) in the diffuser 15a is locally increased, which tends to generate a lamp image. Then, in the present embodiment, the light reflection portion 50 reflecting light from each LED light source 80 (80a) is formed in at least the region overlapping with the light source low-density area LL in the diffuser 15a. Thereby, the light emitted from the LED light sources 80 (80a) in the light source low-density area LL is mostly reflected to the chassis 14 side by the light reflection portion 50 once. The light is reflected in the chassis 14 while the light is mixed with each other, and can reach the diffuser 15a again. Thereby, almost uniform brightness can be obtained over the entire diffuser 15a, and the generation of the lamp image can be suppressed.

In the present embodiment, the diffuser 15a includes the light reflection portion 50 formed in the position overlapping with each LED light source 80 (80a) in a plan view. Therefore, because the light emitted from the LED light sources 80 (80a) certainly reaches the light reflection portions 50, and can be reflected to the chassis 14 side by the light reflection portion while the light is mixed with each other, the generation of the lamp image can further be suppressed.

The light reflection portion 50 has a planarly viewed area greater than a planarly viewed area of each LED light source 80 (80a). Therefore, because the light emitted from the LED light sources 80 (80a) can be certainly reflected by the light reflection portion 50, the generation of the lamp image can further be suppressed.

The light reflection portion 50 is formed such that the light reflectance of the diffuser 15a is the greatest in the region overlapping with the light source low-density area LL in the diffuser 15a. Because the light from the LED light sources 80 (80a) can be most reflected in the region overlapping with the light source low-density area LL where the lamp image tends to be generated in the diffuser 15a in this case, the light from the LED light sources 80 (80a) can be likely to be mixed with each other, and the generation of the lamp image can be suitably suppressed.

The diffuser 15a includes the light reflection portion 50 is formed on the surface facing each LED light source 80 (80a). Therefore, because the light reaching the diffuser 15a from the LED light sources 80 (80a) can be certainly reflected, the generation of the lamp image can be suppressed.

The light reflection portion 50 is formed by subjecting the diffuser 15a to print processing. Therefore, the form of the pattern of the light reflection portion 50 can be suitably designed, and the pattern of the light reflection portion 50 can be easily formed as designed.

The chassis 14 includes the light source high-density area LH formed in the center area thereof. Thereby, brightness in the center area of the irradiation surface of the backlight unit 12 is improved. As a result, high brightness in the center area of the display screen is achieved also in the liquid crystal display device 10. Because human eyes usually pay attention to the center area of the display screen, good visibility can be obtained by achieving the high brightness in the center area of the display screen.

The light source high-density area LH has an area smaller than an area of the light source low-density area LL. The light source high-density area LH has the area smaller than the area of the light source low-density area LL, and thereby the number of the LED light sources 80 can further be reduced.

The diffuser lenses 24 configured to diffuse light from the LED light sources 80 (80a) are provided on at least the light exit side of the LED light sources 80 (80a) arranged in the light source low-density area LL. Thereby, the light emitted from the LED light sources (80a) is first diffused by the diffuser lenses 24. Even when the LED light sources 80 (80a) having high light directivity are used, the directivity is relieved. As a result, the light of the adjacent LED light sources 80 (80a) is mixed with each other also in the light source low-density area LL where the LED light sources 80 (80a) are relatively sparsely arranged, and thereby the generation of the lamp image can further be suppressed. The generation of the lamp image in the light source low-density area LL can further be suppressed by the effect of the light reflection portion 50 formed in the region overlapping with the light source low-density area LL of the diffuser 15a as well.

The diffuser lenses 24 have a circular shape in a plan view. Thereby, because the light from the LED light sources 80 (80a) is almost uniformly diffused at 360 degrees by the diffuser lenses 24, the generation of the lamp image can further be suppressed.

The diffuser lens 24 includes the light entrance surface facing each LED light source 80 (80a) and receiving light from each LED light source 80 (80a). The light entrance surface includes the recess 24D formed in the position overlapping with each LED light source 80 (80a). The recess 24D has the side wall inclined so as to face each LED light source 80 (80a). According to such a configuration, the light emitted from the LED light sources 80 (80a) mostly enters the recess 24D of each diffuser lens 24. In this context, the recess 24D has the side wall inclined so as to face each LED light source 80 (80a). Therefore, the light entering the recess 24D reach the side wall, and can be refracted into the diffuser lens 24 at a wide angle (that is, toward the outer side from the inner side of the diffuser lenses 24) through the side wall. Thereby, the local increase in brightness in the region overlapping with the LED light sources 80 (80a) in the diffuser lens 24 can be suppressed, and the generation of the lamp image can further be suppressed.

The diffuser lens 24 has the light exit surface exiting light entering from each LED light source 80 (80a). The light exit surface includes the light exit side recess 24E recessed to the LED light source 80 (80a) side formed in the position overlapping with each LED light source 80 (80a). The amount of light reaching from the LED light sources 80 (80a) in the region overlapping with the LED light sources 80 (80a) in the light exit surface is likely to be increased as compared with that in the other region, which is likely to locally increase brightness. Then, the light exit side recess 24E is formed in the position overlapping with the LED light sources 80 (80a) in the light exit surface. Therefore, the light from the LED light sources 80 (80a) can be refracted at a wide angle by the light exit side recess 34E, or the light from the LED light sources 80 (80a) can be partially reflected. Thereby, the local increase in brightness in the region overlapping with the LED light sources 80 (80a) in the light exit surface can be suppressed, and the generation of the lamp image can further be suppressed.

<Modification of First Embodiment>

As described above, the first embodiment of the present invention has been illustrated. However, the present invention is not limited to the above embodiment. A modification of a distribution mode of the light reflection portions 50 illustrated in FIG. 7 may be employed, for example. In this modification, the same constituent parts and constituent elements as those of the first embodiment are indicated by the same symbols, and will not be described.

Figure 7:
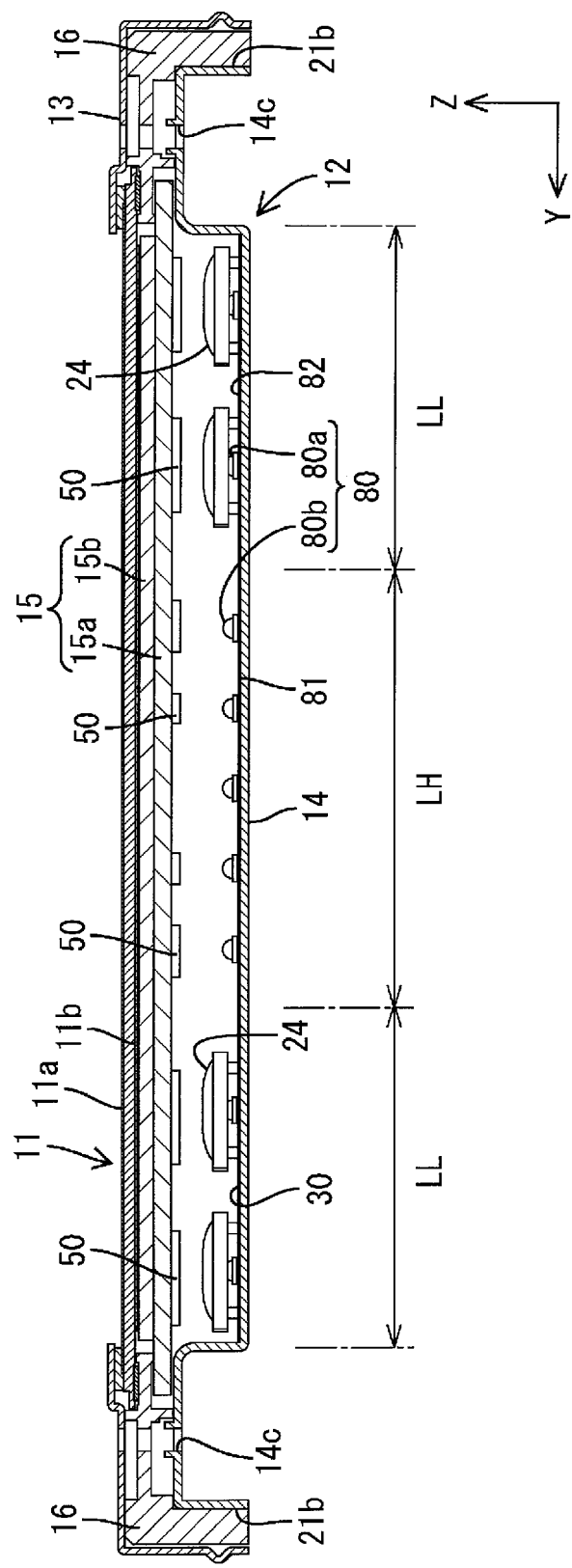
FIG. 7 is a sectional view illustrating a modification of the arranging mode of the light reflection portions.
Figure 8:
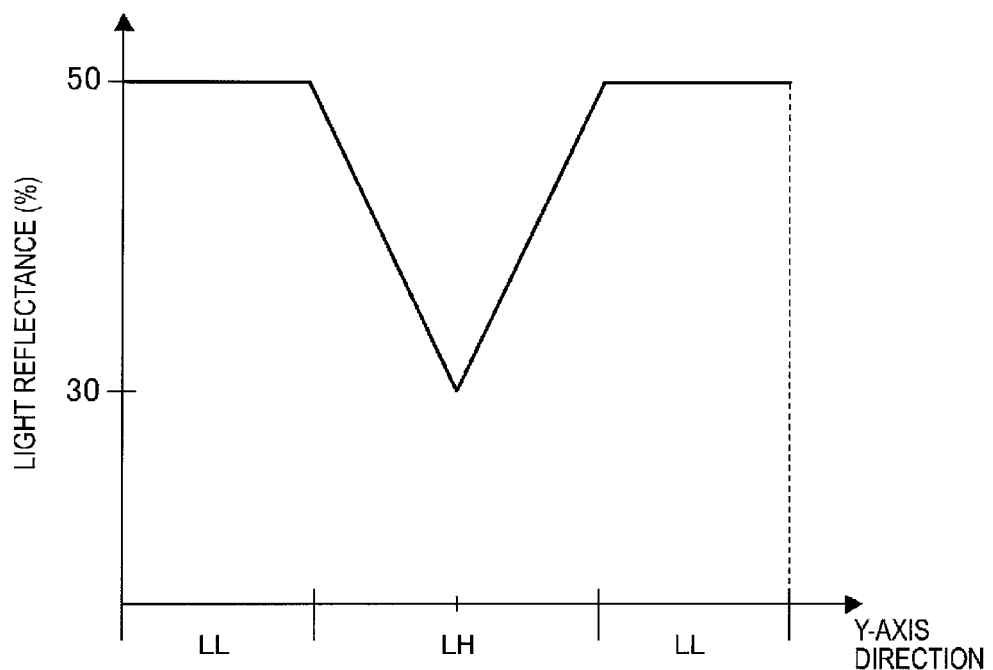
FIG. 8 is a graph showing a change in light reflectance in a Y-axis direction of a diffuser of FIG. 7.

The diffuser 15a in the present modification includes at least the light reflection portions 50 provided in positions facing the LED light sources 80 in not only the position overlapping with the light source low-density area LL but also the position overlapping with the light source high-density area LH as illustrated in FIG. 7. In this case, in the light reflection portions 50, the area of the dot in the position overlapping with the light source high-density area LH is smaller than the area in the light source low-density area LL side, and/or the density of the dot is smaller than the density of the light source low-density area LL side. Thereby, the light reflectance of the diffuser 15a in the light source high-density area LH side is smaller than that in the light source low-density area LL side as illustrated in FIG. 8.

Such a modification can reduce the number of the LED light sources 80 while securing brightness in the center area of the backlight unit 12, and realizes cost reduction. Particularly because the light reflection portions 50 are formed in the outer edge portion in which the number of the LED light sources 80 is reduced, generation of uneven brightness is suppressed. The generation of the uneven brightness in the center area is also suppressed by partially forming the light reflection portions 50 also in the center area.

<Second Embodiment>

Figure 9:
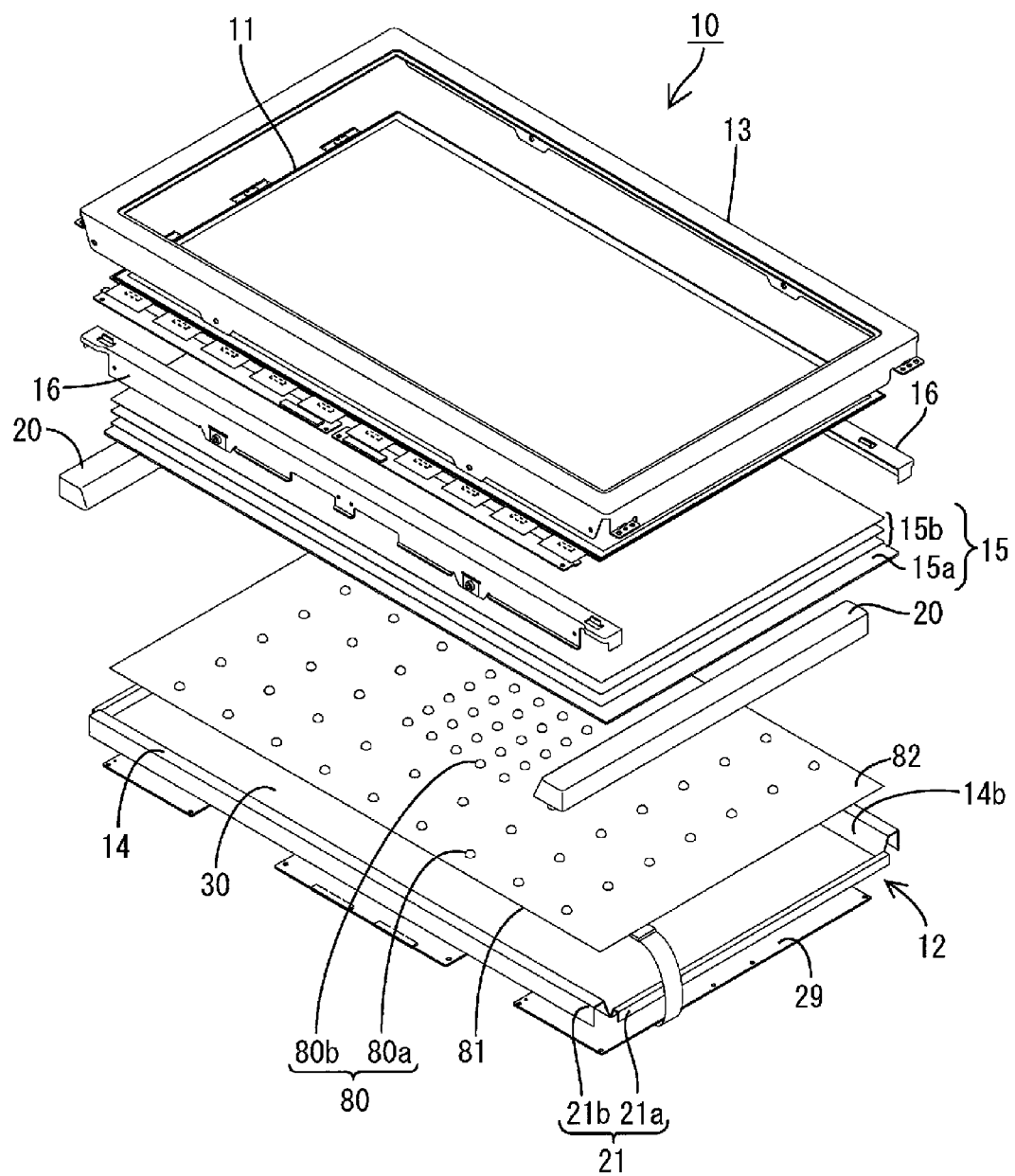
FIG. 9 is an exploded perspective view illustrating a schematic configuration of a television receiver according to a second embodiment of the present invention.
Figure 10:
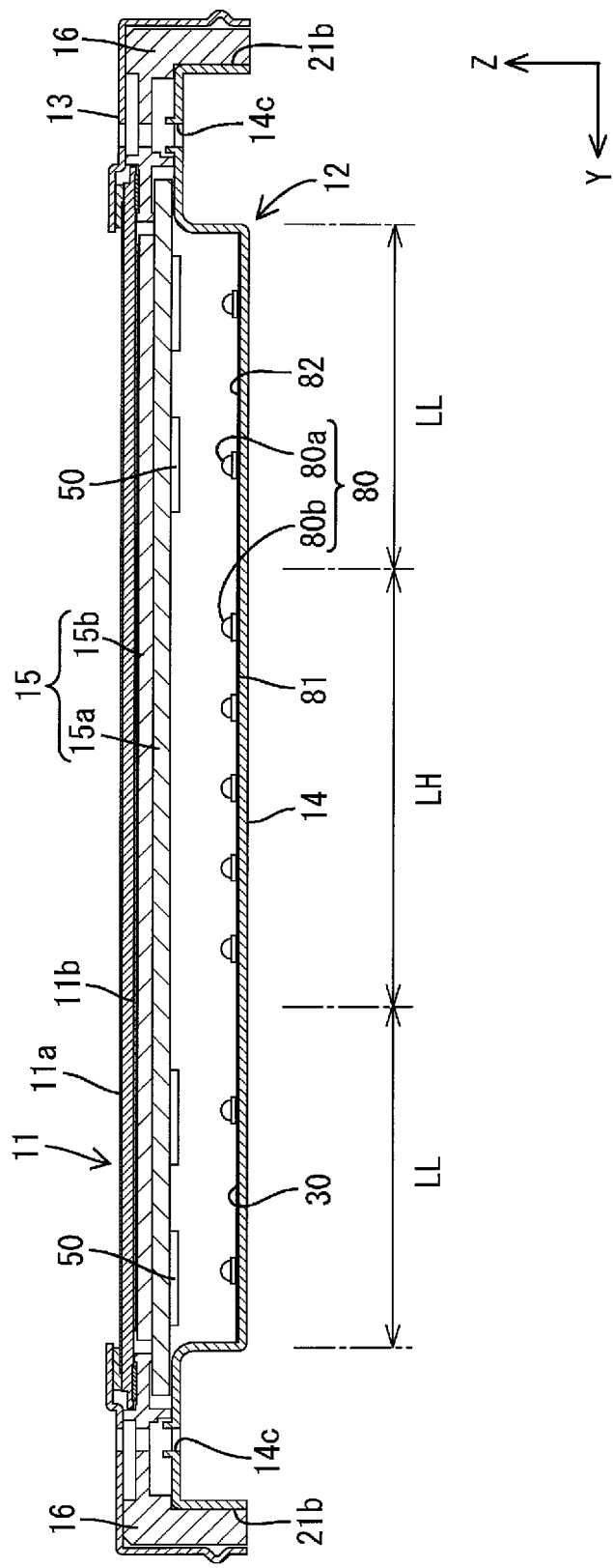
FIG. 10 is a cross-sectional view illustrating a cross-sectional configuration along a short-side direction of the liquid crystal display device included in the television receiver.
Figure 11:
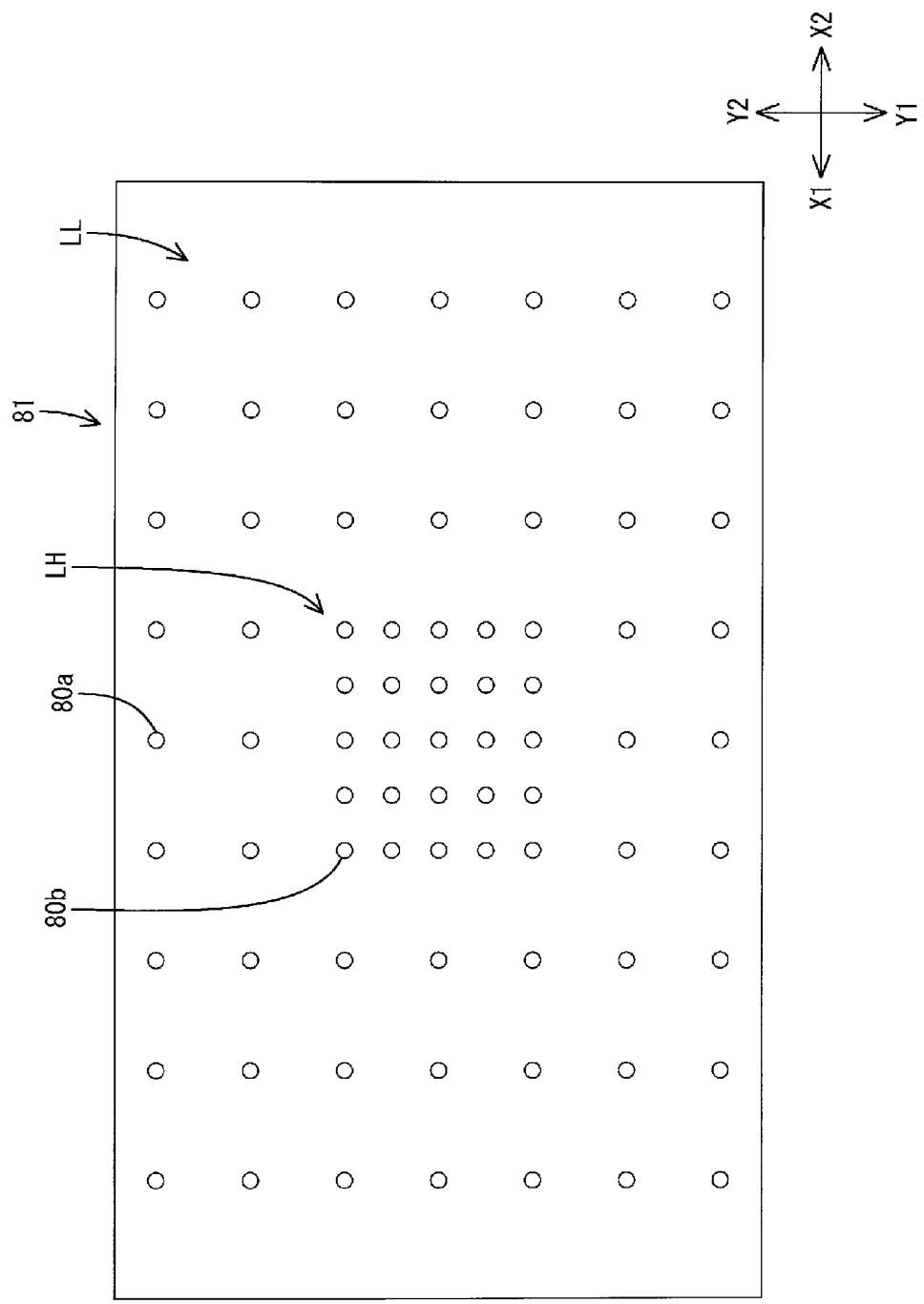
FIG. 11 is a plan view illustrating a schematic configuration of an LED board included in the liquid crystal display device.
Figure 12:
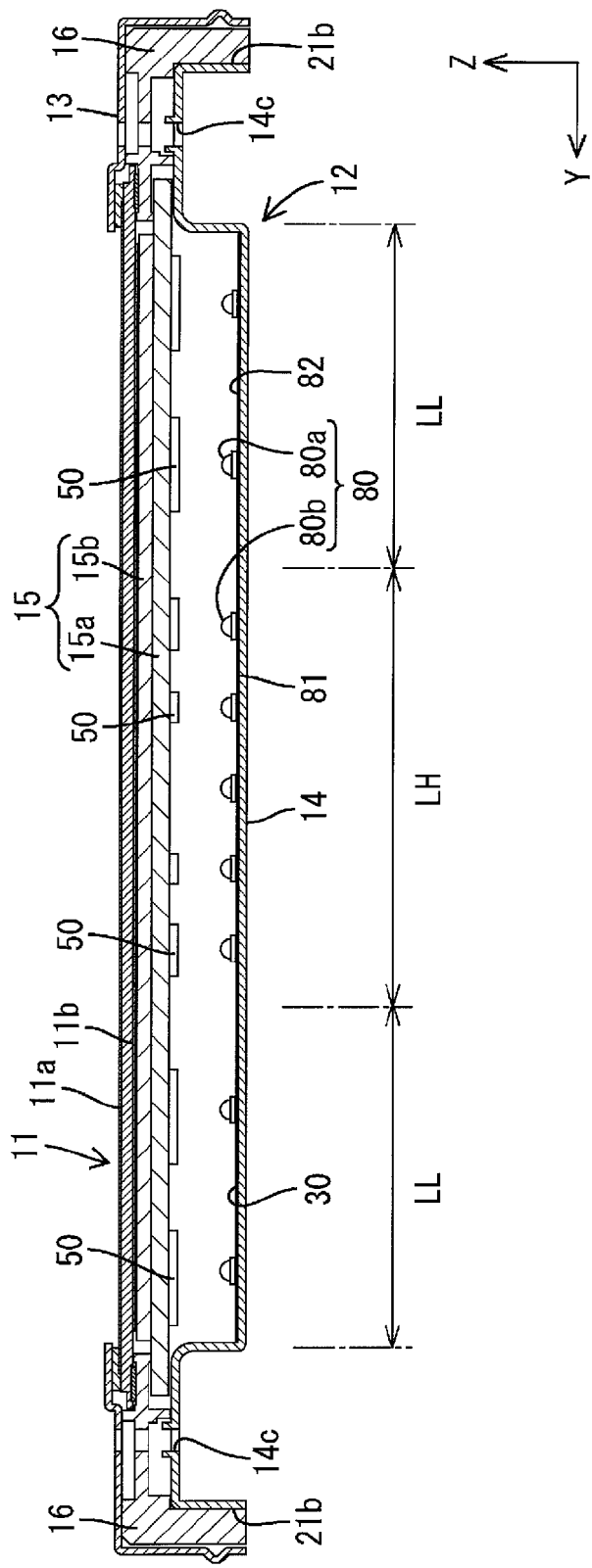
FIG. 12 is a sectional view illustrating a modification of an arranging mode of light reflection portions in the liquid crystal display device of FIG. 11.

Next, a second embodiment of the present invention will be described with reference to FIGS. 9 to 11.

In a liquid crystal display device 10 included in a television receiver TV of the second embodiment, the diffuser lenses 24 are omitted from the backlight unit 12 of the first embodiment, and the others are the same as those of the first embodiment. The same constituent parts as those of the above first embodiment are indicated by the same symbols without repeating overlapping descriptions.

The backlight unit 12 employed for the second embodiment has the LED light sources 80 provided on the LED board 81. The LED light sources 80 are arranged on the LED board 81 such that the light source high-density area LH where the arrangement interval of the LED light sources 80 is relatively small is formed in the center area (that is, the center area of the chassis 14) of the LED board 81, and the light source low-density area LL where the arrangement interval of the LED light sources 80 is relatively large is formed on the outer edge portion (that is, the outer edge portion of the chassis 14) of the LED board 81. The area of the light source high-density area LH located in the center area of the LED board 81 is smaller than the area of the light source low-density area LL located in the outer edge portion of the LED board 81. The LED light sources provided in the light source high-density area LH are illustrated as high density side LED light sources 80b. The LED light sources provided in the light source low-density area LL are illustrated as low density side LED light sources 80a.

In the present embodiment, the diffuser lenses are not formed for both the LED light sources 80b of the light source high-density area LH and the LED light sources 80a of the light source low-density area LL unlike the first embodiment. That is, the light reflection portions 50 are formed on the diffuser 15a, as means for suppressing uneven brightness of the LED light sources 80a configured at low density such that the arrangement interval of the light sources is large. However, the diffuser lenses as means for suppressing uneven brightness are not formed.

In this case, uneven brightness caused by the LED light sources 80a of the light source low-density area LL can be suppressed by the light reflection portions 50 depending on the arrangement interval of the light sources. The area of the dots of the light reflection portions 50 may be increased as compared with that of the first embodiment in order to particularly further eliminate uneven brightness, or the density of the dots may be increased as compared with that of the first embodiment.

<Other Embodiment>

As describe above, the embodiments of the present invention have been described. However, the present invention is not limited to the above embodiments described in the above description and the drawings. The following embodiments are also included in the technical scope of the present invention, for example.

(1) The above embodiments using the LED which is a kind of point light source as the light source have been illustrated. However, other kind of point light source such as a glow lamp is also used in the present invention.

(2) Each dot of the dot pattern constituting the light reflection portion has been formed into a round shape in the above embodiments. However, the shape of each dot is not limited thereto. Optional shapes such as a polygonal shape, for example, a rectangular shape can be selected.

(3) In the above embodiment, the optical sheet set obtained by combining the diffuser with the diffuser sheet, the lens sheet, and the reflecting type polarizing plate is exemplified. However, for example, an optical sheet obtained by laminating two diffusers can also be employed.

(4) The light reflection portions are formed on the surface of the diffuser facing the light source in the above embodiments. However, the light reflection portions may be formed on the surface of the diffuser opposite to the light source.

(5) The configuration in which the light source high-density area is formed in the center area of the bottom plate of the chassis has been illustrated in the above embodiments. However, the configuration can be suitably changed according to the amount of light of the light source and the operating condition of the backlight unit and the like. For example, the light source high-density area is formed in a part of the end portion in addition to the center area of the bottom plate.

The invention claimed is:

1. A lighting device comprising:
a plurality of point light sources;
a chassis housing the point light sources and having an opening through which light emitted from the point light sources exits; and
an optical member facing the point light sources and provided to cover the opening, wherein:
the point light sources are arranged at relatively small intervals in a light source high-density area and the point light sources are arranged at relatively large intervals in a light source low-density area;
the optical member includes a light reflection portion so as to overlap at least the light source low-density area, the light reflection portion is configured to reflect light emitted from the point light sources;
the lighting device further includes a diffuser lens provided on at least a light exit side of the point light sources that are arranged in the light source low-density area, the diffuser lens configured to diffuse light emitted from the point light sources;
the diffuser lens has a light exit surface facing the optical member and light emitted from the point light source and entering the diffuser lens exits from the light exit surface; and
the light exit surface has a light exit side recess so as to overlap the point light source, the light exit side recess is recessed to the point light source side.

2. The lighting device according to claim 1, wherein the optical member includes the light reflection portion so as to overlap each of the point light sources in a plan view.

3. The lighting device according to claim 2, wherein the light reflection portion has a planar area greater than each of the point light sources.

4. The lighting device according to claim 1, wherein the light reflection portion is formed such that a light reflectance of a portion of the optical member overlapping the light source low-density area is highest.

5. The lighting device according to claim 1, wherein the optical member includes the light reflection portion on a surface thereof facing one of the point light sources.

6. The lighting device according to claim 1, wherein the light reflection portion is formed by subjecting the optical member to print processing.

7. The lighting device according to claim 1, wherein the chassis includes the light source high-density area in a middle area thereof.

8. The lighting device according to claim 1, wherein the chassis includes the light source low-density area in an outer side portion thereof.

9. The lighting device according to claim 1, wherein the light source high-density area is smaller than the light source low-density area.

10. The lighting device according to claim 1, wherein the diffuser lens has a circular shape in a plan view.

11. The lighting device according to claim 1, wherein the optical member is a light diffusing member configured to diffuse light from the point light sources.

12. The lighting device according to claim 1, wherein the point light sources are LEDs.

13. The display device comprising:
the lighting device according to claim 1; and
a display panel configured to provide display using light from the lighting device.

14. The display device according to claim 13, wherein the display panel is a liquid crystal panel using liquid crystals.

15. A television receiver comprising the display device according to claim 13.

16. A lighting device, comprising:
a plurality of point light sources;
a chassis housing the point light sources and having an opening through which light emitted from the point light sources exits; and
an optical member facing the point light sources and provided to cover the opening, wherein:
the point light sources are arranged at relatively small intervals in a light source high-density area and the point light sources are arranged at relatively large intervals in a light source low-density area;
the optical member includes a light reflection portion so as to overlap at least the light source low-density area, the light reflection portion is configured to reflect light emitted from the point light sources;
the lighting device further includes a diffuser lens provided on at least a light exit side of the point light sources that are arranged in the light source low-density area, the diffuser lens configured to diffuse light emitted from the point light sources;
the diffuser lens has a light entrance surface facing one of the point light sources and receiving light from the point light source;
the light entrance surface has a light entrance side recess so as to overlap the point light source, the light entrance side recess is recessed to the optical member side; and
the light entrance side recess has a side wall inclined so as to face the point light source.

* * * * *